R. R. OSGOOD.
Modes of Fastening the Racks of Dredging-Machine Dipper-Handles.

No. 143,247.  Patented September 30, 1873.

Witnesses.
R. S. Campbell
H. Rutherford

Inventor
Ralph R. Osgood
by his attys
Mason Fenwick Lawrence

UNITED STATES PATENT OFFICE.

RALPH R. OSGOOD, OF TROY, NEW YORK.

IMPROVEMENT IN THE MODES OF FASTENING THE RACKS OF DREDGING-MACHINE DIPPER-HANDLES.

Specification forming part of Letters Patent No. 143,247, dated September 30, 1873; application filed August 28, 1873.

*To all whom it may concern:*

Be it known that I, RALPH R. OSGOOD, of Troy, in the county of Rensselaer and State of New York, have invented an Improved Fastening for Racks or Segments for Dredging-Machine Dipper-Handles; and I do hereby declare that the following is a full, clear, and exact description thereof, reference being had to the accompanying drawings making part of this specification, in which—

Figure 1:
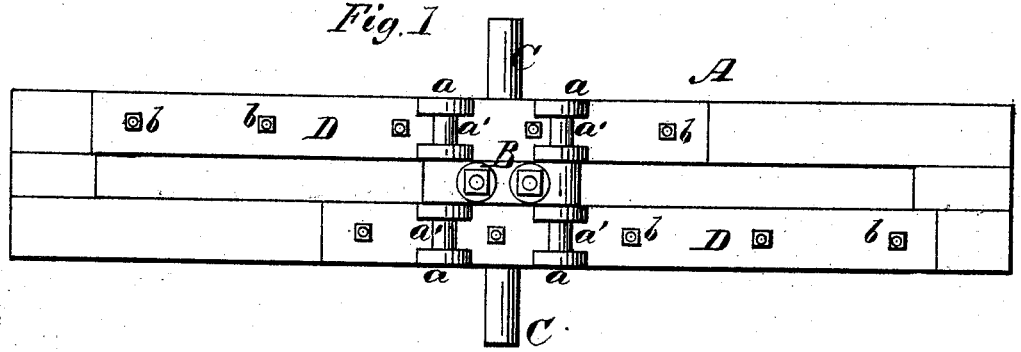
Figure 2:
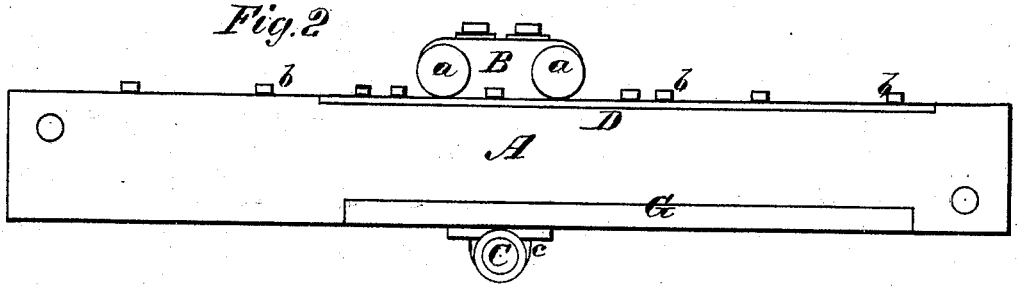
Figure 3:
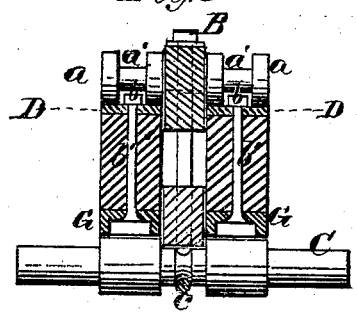

Figure 1 is a top view, showing my improvement applied to part of a dipper-handle. Fig. 2 is a side view of the same. Fig. 3 is a cross-section.

Similar letters of reference indicate corresponding parts in the several figures.

The nature of my invention consists in securing the racks to the handles by means of bolts which are passed through the racks from below upward, and provided with exposed nuts on their upper ends, which nuts are set down upon the wearing-plates, on which the carriage or slide is moved, the latter being suitably grooved so as to work on opposite sides of said nuts, as will be hereinafter explained.

The following description of my invention will enable others skilled in the art to understand it.

In the accompanying drawings, A represents part of the dipper-handle of a dredging-machine, which works up and down and back and forth between the beams of the crane. This handle A is suspended upon the top beams of the crane by means of a carriage, B, or if preferred, a slide may be used. The carriage B, shown in the drawings, is mounted upon the handle A, by means of wheels $a$, which are annularly grooved, and which roll upon wearing-plates D D that serve as washers for nuts $b$, as well as to protect the handle A from rapid wear. The shaft C, on which the chain-wheels and rack-spurs are placed, is hung centrally from the carriage B, by a loop, $c$, in the usual well-known manner, which loop is received between the two bars constituting the handle A. G G represent the racks, with which spur-wheels engage for moving the dipper-handle in endwise directions. These racks have side flanges formed on them, and they are rigidly secured to the bottom of the handle A by means of bolts $b'$, which are passed up through them, through the handle A, and through the plates D, and have nuts $b$ on their upper ends, which confine the racks rigidly to their places, and hold them there. These nuts are exposed on the plates D, so that they are accessible, by means of a wrench, for unscrewing them should a rack break.

As the nuts are thus exposed on the plates D it becomes necessary to groove the rollers $a$ at $a'$, so that they will pass the nuts and have a broad bearing on opposite sides of them. If slides be used instead of a rolling-carriage they will be grooved so as to pass over the nuts.

It will be seen that should the racks break, which is quite often, they can be readily removed and new racks substituted; also, that the raised nuts are not in the way of the rollers of carriage B.

Having described my invention, what I claim as new, and desire to secure by Letters Patent, is—

The racks G G, secured to the dipper-handle by means of nuts, which are exposed upon plates D D, substantially as and for the purposes described.

RALPH R. OSGOOD.

Witnesses:
SEDGWICK L. SINOUS, Jr.,
B. C. HARD.